United States Patent Office 2,984,681
Patented May 16, 1961

2,984,681

PROCESS FOR THE PRODUCTION OF PHOSPHORUS-CONTAINING COMPOUNDS

Earl G. De Witt, Baton Rouge, La., assignor to Ethyl Corporation, New York, N.Y., a corporation of Delaware No Drawing. Filed May 22, 1958, Ser. No. 736,981

6 Claims. (Cl. 260—461)

This invention pertains to a novel process for the production of tris(chloroalkyl) thionophosphates.

This application is a continuation-in-part of application S.N. 392,455 filed Nov. 16, 1953, now abandoned, which is in turn a continuation-in-part of application S.N. 390,428 filed Nov. 5, 1953, now abandoned.

It has long been known that various chlorinated alkyl phosphates can be prepared by the reaction of phosphorus oxychloride with an epoxide such as ethylene oxide. This reaction can be performed either with or without a metal halide catalyst. Since the reaction will go without a catalyst, the effect of the catalyst is merely to increase the time-yield of the reaction.

For some reason unknown to applicant, reactions of thiophosphoryl chlorides are not analogous to the reactions of phosphorus oxychlorides. Thus it has been found that thiophosphoryl chloride will not react with an alkylene oxide in the absence of a catalyst. Unexpectedly, however, it has been found that such reaction will go smoothly to completion when carried out in the presence of specified proportions of a titanium halide catalyst. In this respect the function of the catalyst is to actually cause the reaction to take place rather than merely to increase its rate. It can be seen, therefore, that the function of the catalyst in the reaction of thiophosphoryl chloride with an epoxide is not at all analogous to the function of the catalyst in the reaction of phosphorus oxychloride with an epoxide. In the one case, the catalyst is necessary to cause any reaction at all, whereas, in the other case, the catalyst merely increases the rate of reaction.

It is an object of this invention to provide a new and novel process for the production of tris(chlorinated alkyl) thionophosphates. This and other objects will become apparent in the discussion hereinafter.

The process of this invention in its broadest form comprises reaction between thiophosphoryl chloride and an alkylene oxide containing from 2 to 4 carbon atoms. The process of this invention comprises reacting the alkylene oxide compounds with thiophosphoryl chloride in the presence of a titanium halide catalyst so as to result in the formation of various tris(chloroalkyl) thionophosphates. Solvents can also be employed, preferably those which are inert toward the reactants.

By the term "alkylene oxide compounds" it is intended to include compounds having the following structure:

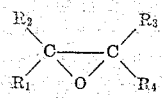

wherein $R_1$, $R_2$, $R_3$ and $R_4$ can be the same or different and are selected from the group consisting of hydrogen, methyl and ethyl radicals with the total number of carbon atoms in the molecule not exceeding 4. More specifically this includes epoxyethane, epoxypropane, 1,2-epoxybutane, 2,3-epoxybutane and 1,2-epoxyisobutane.

The presence of a titanium halide catalyst has been found to be critical to the process of the present invention. In the absence of such a catalyst it has been found that no reaction occurs between thiophosphoryl chloride and a cyclic organic oxide so as to form a tris(chloroalkyl) thionophosphate. The titanium halide catalyst may include any of the titanium halide salts which complex with thiophosphoryl chloride. This includes for example, the tetra, tri and di chloride salts of titanium and the corresponding bromide, fluoride and iodide salts.

The proportions of the alkylene oxide compound and the thiophosphoryl chloride are not critical to this invention. It is, however, preferred that at least the stoichiometric quantities are employed. Ordinarily, a slight excess of the cyclic organic oxide compound is employed for more efficient operation. The proportion of the catalyst employed in the process of this invention is preferred to be at least 0.05 percent by weight based upon the cyclic organic oxide compound and preferably not more than about 5 percent by weight. It has been found that quantities in excess of 5 percent by weight do not appreciably increase the rate of reaction. Although quantities in excess of this amount are not detrimental, excessive amounts have not been found to be economical.

The temperature employed in carrying out the process of this invention is any temperature at which the reaction will commence. Once the reaction has started it is preferable to maintain the temperatures from about 70 to 150° C. A preferred temperature range is between about 90 and 110° C. In this range the reaction is particularly easy to control and goes to completion to give an almost quantitative yield of product. At higher temperatures the reaction is harder to control since it is exothermic and the danger of deleterious side reactions is increased. At lower temperatures the reaction time is increased and generally lower yields are obtained. Ordinarily, the reaction is conducted at atmospheric pressure, thus avoiding the necessity of expensive pressurized equipment.

The sequence of mixing the reactants is not critical. The preferred mode of mixing is, however, to add the alkylene oxide to the thiophosphoryl chloride. When the addition is in the reverse order, the relatively low boiling points of the alkylene oxide limits the temperatures at which the reaction can be carried out at atmospheric pressure. When the reaction is carried out under pressure the boiling points of the alkylene oxides do not prevent the use of higher reaction temperatures. Under these conditions the order of mixing is not so important.

A further factor affecting the order of mixing is the fact that under some conditions alkylene oxides have been known to polymerize in the presence of an acid catalyst. This is another reason for preferring to add the alkylene oxide to the thiophosphoryl chloride.

The catalyst can ordinarily be added at any time. It can be mixed with the alkylene oxide and then added to the thiophosphoryl chloride. It can be mixed with the thiophosphoryl chloride which is added to the alkylene oxide. Also, it can be added to the mixture of thiophosphoryl chloride and alkylene oxides. Generally, it is preferred to add the catalyst before the reactants have been mixed. Since the reaction is exothermic, the addition of the catalyst before the reactants have been mixed makes it easier to control the reaction temperature.

The following examples wherein all parts and percentages are by weight will further demonstrate the process of this invention.

*Example I*

One and seven-tenths parts of titanium tetrachloride was added to 153.5 parts of thiophosphoryl chloride in a reactor equipped with stirrer, dropping funnel and condenser. The condenser was connected to a cold trap and the entire system was protected from moisture by a Drierite tube. The reactor containing the thiophosphoryl chloride was heated to 70° C. and propylene oxide was added. The addition of 16 parts of propylene oxide dropped the temperature to 65° C. The reaction was continued, that is with refluxing, until after 2 hours the reaction temperature reached 90° C. One hundred and sixty-seven parts of propylene oxide was added at between 90–95° C. at a rate chosen so as to maintain very slight reflux. After 7 hours, 183 parts of propylene oxide had been added. Heating was continued overnight at an average temperature of 80° C. In the morning the product was stripped free of excess propylene oxide and low boiling components. An aspirator was used and the maximum pot temperature was 105° C. The stripped product residue constituted 302 parts by weight giving a 97.2 percent yield of essentially pure tris(β-chloropropyl) thionophosphate.

*Example II*

One and seven-tenths parts of titanium tetrachloride was added to 153.5 parts of thiophosphoryl chloride contained in a reaction vessel as described in Example I. The flask was heated to 105° C. whereupon propylene oxide was added very slowly and the temperature briefly rose to 120° C. This run differed from that set forth in Example I in that it was more exothermic. The propylene oxide reacted as fast as it was fed, heat was evolved, and some cooling was necessary to hold the reaction temperature at 100–110° C. One hundred and eighty-three parts of propylene oxide was added over a 5 to 6 hour period. The reaction mixture was then heated overnight at a temperature of 80° C. In the morning the reaction product was stripped free of excess propylene oxide and low boiling components. An aspirator was used and the maximum pot temperature was 105° C. The stripped product consisted of 304.5 parts of essentially pure tris(β-chloropropyl) thionophosphate. This constituted a yield of 97.8 percent.

*Example III*

Into equipment as described in the preceding example, 84 parts of thiophosphoryl chloride and 1 part of titanium tetrachloride (TiCl$_4$) were added. While maintaining an atmosphere of nitrogen in the reaction vessel, its temperature was raised to 70° C. At this temperature, 94.4 parts of propylene oxide were added. The temperature was maintained at 70° C. by means of external cooling. After the addition of the propylene oxide was completed, the reaction mass was continuously stirred for about 30 minutes at the same temperature. Then the excess propylene oxide was removed by fractional distillation. At the completion of the distillation operation, the products were cooled and washed twice with 100 parts of 10 percent aqueous solution of disodium tartrate followed by two washings with 100 parts of water. The product was then separated from the aqueous phase and dried over anhydrous sodium sulfate. The yield by this process was 120 parts amounting to 70 percent of theoretical. Upon subjecting this product to chemical analysis, it was found that it contained 9.02 percent of phosphorus, 9.07 percent of sulfur, and 31.4 percent of chlorine, whereas the formula C$_9$H$_{18}$Cl$_3$O$_3$PS requires 9.02 percent of phosphorus, 9.36 percent of sulfur, and 30.9 percent of chlorine. The product possesses an index of refraction of $n_D^{21.5}$ 1.4910 and had a boiling range at 1 millimeter pressure of 140 to 160° C.

*Example IV*

This run was conducted essentially the same as that described in the preceding example wherein 506 parts of thiophosphoryl chloride and 2 parts of titanium tetrachloride were added to the reactor. With the temperature being the same, 580 parts of propylene oxide were added to the foregoing mixture. The product obtained upon completion of the distillation operation was twice washed with 300 parts of the aqueous solution of disodium tartrate followed by two washings with 300 parts of water. The product was then separated from the aqueous phase and dried over anhydrous sodium sulfate. The yield obtained was 856 parts amounting to 83 percent of theoretical. The product possesses an index of refraction of $n_D^{21.5}$ 1.4910 and had a boiling range at 1 millimeter pressure of 140 to 160° C.

*Example V*

To a solution of 1 part of titanium dibromide in 169.5 parts of thiophosphoryl chloride, held at 95° C. is added, dropwise, over 4 hours, 145 parts (10 percent excess over theory) of ethylene oxide. After an additional hour of heating at the same temperature, the unreacted ethylene oxide is removed by stripping from the reaction mixture under 50 mm. of pressure and with a maximum pot temperature of 80° C. The product is diluted with benzene to aid in handling, and the titanium catalyst is removed by washing with disodium tartrate solution, followed by water. After drying over anhydrous Na$_2$SO$_4$, the benzene is removed in vacuo, leaving a pale yellow oil. The yellow oil is tris(β-chloroethyl) thionophosphate in better than 90 percent yield.

*Example VI*

Using the conditions of Example V, 1 part of titanium trichloride and 169.5 parts of thiophosphoryl chloride are reacted with 232 parts of mixed butylene oxides at 95–105°. The final product consists of 378 parts of essentially pure tri(β-chlorobutyl) thionophosphate.

The preceding examples, I–VI, illustrate the process of my invention. As shown, it is clear that thiophosphoryl chloride reacts smoothly with an alkylene oxide in the presence of a titanium halide catalyst to give almost quantitative yields of tris (chloroalkyl) thionophosphate.

That this result should occur is truly surprising since thiophosphoryl chloride shows no sign of reaction with an alkylene oxide when heated therewith for extended periods in the absence of a catalyst. Thus, the effect of the catalyst in my invention is to make the reaction take place rather than merely to influence the reaction rate. The reaction of phosphoryl chloride with an alkylene oxide takes place either with or without a catalyst being present. Catalytic action in this reaction then affects only the rate of the reaction. Thus, the reaction of thiophosphoryl chloride with an alkylene oxide is completely non-analogous to the reaction of phosphoryl chloride with an alkylene oxide. This paints up the surprising nature of my method since it would normally be assumed that the thiophosphoryl chloride would react in a similar manner to phosphoryl chloride.

The following examples illustrate the completely non-analogous nature of thiophosphoryl chloride and phosphoryl chloride regarding reaction with an alkylene oxide compound.

*Example VII*

Fifty-three and seven-tenths parts of phosphorus oxychloride (POCl$_3$) was heated to 95° C. in a reactor equipped with stirrer, dropping funnel and condenser. The condenser was connected to a cold trap to collect any propylene oxide which might escape during the reaction, and the entire system was protected from moisture by a Drierite tube. Seventy and nine-tenths parts of propylene oxide were added very slowly to the reactor. The addition took place over 6 hours with the reaction temperature held at 95–102° C. The addition was made slowly because of the fact that the epoxide-phosphorus oxychloride mixture boiled at a pot temperature of about 102° C. After the addition the product mixture was heated another 2 hours to ensure complete reaction of the propylene oxide. After cooling, the reactor contents comprised 124.5 parts by weight. The contents were stripped to remove excess propyleneoxide and the residue amounted to 109.5 parts of essentially pure tris(β-chloropropyl) phosphate. This gave a yield which was 95.6 percent of the theoretical.

Example VIII

One hundred and fifty-three and five-tenths parts of thiophosphoryl chloride were placed in a reactor equipped in the manner described in Example I. The reactor was heated to 110° C. and propylene oxide was added. The temperature dropped to 102° C. after 4.2 parts of propylene oxide had been added and did not rise after 3 hours at reflux. Another 8.4 parts of propylene oxide was added and heat to the system was increased, but still there was no temperature rise. This indicated quite clearly that the propylene oxide was not reacting with the thiophosphoryl chloride. The condenser was removed and proylene oxide was distilled out until the temperature had reached 135° C. At this point another 4.2 parts of propylene oxide was added but no reaction was evident.

Examples VII and VIII clearly show the very basic difference between the reactions of phosphorus oxychloride and thiophosphoryl chloride with an epoxide to form tris(chloroalkyl) phosphorus esters. As shown in Example VII, phosphorus oxychloride reacted smoothly with propylene oxide at a temperature of 95–102° C. to give a yield of tris($\beta$-chloropropyl) phosphate which was 95.6 percent of the theoretical. On the other hand, thiophosphoryl chloride did not react with propylene oxide even when the system was heated to the high temperature of 135° C.

Although hydrolytic treatment has been described in some of the foregoing examples, such treatment is not intended to be a limitation of this invention. Ordinarily the products obtained according to the process of this invention can be used as obtained without such treatment. In some instances this treatment is desirable in that it removes metallic salts of phosphorus acids.

One of the features of the present invention is that in cases where mixtures of products are possible, as when asymmetric cyclic alkylene oxides are used, the distribution of such products is different than when the mixtures are prepared by other methods and these particular mixtures are specially suitable for certain uses. A particular use for these mixtures is as additives for fuels and lubricating oils.

The variance in the products depends upon which carbon-to-oxygen bond is cleaved during the course of the reaction. When a mixture of cyclic alkylene oxides is used, there will be formed a plurality of $\beta$-chloro-aliphatic esters of thionophosphoric acid, the ratio of the constituents being determined by the original proportions of cyclic alkylene oxide, their representative reaction ratios and the manner in which the carbon-to-oxygen epoxide linkage is cleaved. As described, the foregoing type of reaction products can be separated into individual constituents by conventional methods such as fractionation, solvent extraction, chromatography and the like. Likewise, stepwise addition of the various starting materials can be employed to produce mixed compounds.

When a solvent is employed in conducting the process of this invention, it is preferred that the solvent be inert to the particular reactants. Likewise, in a preferred embodiment, the solvents which are normally liquid at room temperature and have a boiling point approaching that of the reaction temperature are employed. In general, anhydrous solvents are employed and are preferred. Typical solvents include aliphatic and aromatic hydrocarbons such as mineral oils, white oils, and the like, and chlorinated derivatives thereof; nitrobenzenes; ethers; and the like. Still other solvents can be employed, the foregoing serving merely as illustrative examples. If it is desirable to employ a volatile solvent, pressure can be employed in order to achieve the reaction temperature.

As an illustrative example of the utility of the products of my process as gasoline additives, there are presented the following test results. A commercial hydrocarbon fuel was treated with tris($\beta$-chloropropyl) thionophosphate and a second portion of the same hydrocarbon fuel was treated only with a conventional antiknock mixture. These fuel blends were subjected to a test procedure involving the use of a single cylinder test engine. This engine was equipped with an L-head cylinder and an electronic wild ping counter which records the total number of wild pings which have occurred during the test periods. Deposit-induced autoignition is known as "wild ping" and is a different phenomenon from ordinary knock. This phenomenon is an erratic, uncontrolled ignition ordinarily occurring at a different period in the combustion cycle than ordinary combustion induced by the spark. Wild ping manifests itself both as an audible and an inaudible uncontrolled combustion.

Since deposit-induced ignition is the tendency of deposits to ignite the fuel-air mixture erratically and to produce uncontrolled combustion noticeable as autoignition, wild ping, pre-ignition, etc., the electronic counter, which is used in conjunction with an ionization gap, automatically detects and records uncontrolled combustion. This 40-hour, short term test starts with a clean combustion chamber and provides average rate of deposit ignitions. The test is used primarily for screening fuel additives. Operation is summarized below.

| Load | Idle | | Full Throttle |
|---|---|---|---|
| Cycle Duration, seconds | 50 | | 150 |
| Speed, r.p.m | 600 | | 900 |
| Fuel-Air Ratio | 0.087 | | 0.077 |
| Ignition Timing | | TDC | |
| Coolant Temperature, F | | 148 | |
| Oil Temperature, F | | 160 | |
| Intake Air Temperature, F | | 110 | |
| Compression Ratio | | 7.0:1 | |
| Test Duration, hours | | 40 | |

Engine assembly involves a clean combustion chamber, induction system, and crankcase. Primary observations are the deposit-induced autoignition rate and induction system cleanliness. The above commercial premium-grade fuel base stock, plus 3.0 ml./gal. tetraethyllead as a fluid containing ethylene dichloride, ethylene dibromide and tetraethyllead in such proportions that 0.5 theory of ethylene dibromide and 1.0 theories of ethylene dichloride are present, was treated with 0.35 gram per gallon of tris($\beta$-chloropropyl) thionophosphate, corresponding to 0.1 theory of phosphorus. Upon addition of the additive and gentle agitation a homogeneus, clear fuel blend was obtained. This fuel was thereupon employed in the above-described engine under identical conditions.

It was established that the reduction in wild ping compared to operation of the engine on the fuel in the absence of tris(chloropropyl) thionophosphate was 70 percent. Similarly, at higher concentrations, for example 0.2 theory of phosphorus, a reduction of 79 percent was obtained. At the extremely low concentration of 0.05 theory of phosphorus as tris($\beta$-chloropropyl) thionophosphate a reduction of wild ping of approximately 60 percent was obtained over that obtained with the conventional fuel.

The term "theory" is commonly used in the art and is defined as the amount of an additive which would be required to react stoichiometrically with the lead in the gasoline. The reaction between tris($\beta$-chloropropyl) thionophosphate and lead yields the compound lead orthophosphate having the formula $Pb_3(PO_4)_2$. Thus a theory of a phosphorus compound is that amount which gives a ratio of two atoms of phosphorus for each three atoms of lead in the fuel. Ethylene chloride and ethylene bromide react with lead to yield respectively lead dichloride and lead dibromide. Thus, a theory of halogen scavenger is the quantity which provides two atoms of halogen for each atom of lead in the fuel.

In the foregoing discussion, the compounds produced according to the process of this invention have been referred to as thionophosphates. This nomenclature has been used consistently for uniformity. However, the compounds are sometimes loosely referred to as the thiophosphates. Thus, where the term thiono has been used, the meaning intended is that the sulfur is bonded to the phosphorus by a coordinate covalent bond.

Having thus described the novel process of this invention, it is not intended that it be limited except as noted in the appended claims.

I claim:

1. A process for the manufacture of tris(β-chloroalkyl) thionophosphates which comprises reacting an alkylene oxide having from two to four carbon atoms with thiophosphoryl chloride in the presence of a titanium halide catalyst.

2. The process of claim 1 wherein the reaction temperature is maintained between about 90 to 110° C.

3. The process of claim 2 wherein the catalyst is a titanium halide present in amount between 0.05 to 5 percent by weight of the alkylene oxide starting material.

4. The process of claim 3 wherein the alkylene oxide is epoxypropane.

5. The process of claim 4 wherein the titanium halide catalyst is titanium tetrachloride.

6. The process of claim 5 wherein the epoxypropane is added to the reaction mixture comprising thiophosphoryl chloride and a titanium halide catalyst.

References Cited in the file of this patent

UNITED STATES PATENTS

| | | |
|---|---|---|
| 1,936,985 | Lommel et al. | Nov. 28, 1933 |
| 2,157,164 | Daly et al. | May 9, 1936 |
| 2,610,978 | Lanham | Sept. 16, 1952 |
| 2,716,657 | Bretschneider | Aug. 30, 1955 |
| 2,791,574 | Lanham | May 7, 1957 |

OTHER REFERENCES

Kosolapoff: "Organo-Phosphorus Compounds," John Wiley & Sons, Inc. (New York) (1950), pp. 211, 216 and 228.